United States Patent
Griffin et al.

(10) Patent No.: US 11,836,108 B2
(45) Date of Patent: Dec. 5, 2023

(54) PERFORMING FILE DIFFERENTIAL OPERATIONS ON QUANTUM FILES IN A STATE OF SUPERPOSITION

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 326 days.

(21) Appl. No.: 17/157,341

(22) Filed: Jan. 25, 2021

(65) Prior Publication Data

US 2022/0237146 A1    Jul. 28, 2022

(51) Int. Cl.
*H04L 67/14*    (2022.01)
*G06F 16/11*    (2019.01)
*G06N 10/00*    (2022.01)

(52) U.S. Cl.
CPC ........... *G06F 16/122* (2019.01); *G06N 10/00* (2019.01)

(58) Field of Classification Search
None
See application file for complete search history.

(56) References Cited

U.S. PATENT DOCUMENTS

| | | | |
|---|---|---|---|
| 10,250,271 B2 | 4/2019 | Goto | |
| 2005/0059020 A1* | 3/2005 | Vitaliano | G06N 10/00 702/19 |
| 2005/0059138 A1* | 3/2005 | Vitaliano | G06N 10/00 372/1 |
| 2005/0059167 A1* | 3/2005 | Vitaliano | G01N 33/588 702/19 |

(Continued)

FOREIGN PATENT DOCUMENTS

| | | |
|---|---|---|
| CN | 108984849 A | 12/2018 |
| WO | 2020106777 A1 | 5/2020 |

OTHER PUBLICATIONS

Patel, Tirthak, et al., "Ureqa: Leveraging Operation-Aware Error Rates for Effective Quantum Circuit Mapping on NISQ-Era Quantum Computers," Northeastern University, Proceedings of the 2020 USENIX Annual Technical Conference, Jul. 15-17, 2020, available online at https://www.usenix.org/conference/atc20/presentation/patel, pp. 705-711.

Unknown Author, "Multiple Qubits and Entangled States," Available online at https://qiskit.org/textbook/ch-gates/multiple-qubits-entangled-states.html, accessed Dec. 10, 2020, 14 pages.

(Continued)

*Primary Examiner* — Tarek Chbouki
*Assistant Examiner* — Loan T Nguyen
(74) *Attorney, Agent, or Firm* — Dority & Manning, P.A.

(57) ABSTRACT

Performing file difference operations on quantum files in a state of superposition is disclosed herein. In one example, a quantum computing device accesses a first plurality of data values of a first plurality of qubits for a first quantum file, as well as a second plurality of data values of a second plurality of qubits for a second quantum file, wherein the first plurality of qubits and the second plurality of qubits are in a state of superposition. A plurality of read operations are performed on each qubit of the first plurality of qubits and the second plurality of qubits to determine a corresponding first plurality of data values and a second plurality of data values. A file difference operation is then performed using the first plurality of data values and the second plurality of data values, and a result is generated based on the file difference operation.

20 Claims, 8 Drawing Sheets

(56) References Cited

U.S. PATENT DOCUMENTS

| | | | |
|---|---|---|---|
| 2019/0042970 A1* | 2/2019 | Zou | G06F 9/3877 |
| 2019/0042971 A1* | 2/2019 | Zou | G06F 15/16 |
| 2019/0042972 A1* | 2/2019 | Zou | G06F 9/30101 |
| 2019/0042973 A1* | 2/2019 | Zou | G06F 9/30101 |
| 2019/0042974 A1* | 2/2019 | Daraeizadeh | G06T 15/005 |
| 2020/0117764 A1* | 4/2020 | Zuccarelli | G06F 30/20 |
| 2020/0242500 A1 | 7/2020 | Girvin et al. | |
| 2020/0334101 A1 | 10/2020 | Albert et al. | |
| 2021/0091755 A1* | 3/2021 | Cohen | G06N 10/00 |

OTHER PUBLICATIONS

Zhang, Yu et al., "Optimizing Quantum Programs against Decoherence—Delaying Qubits into Quantum Superposition," School of Computer Science and Technology University of Science and Technology of China, Jul. 27, 2019, 8 pages.

\* cited by examiner

```
┌─────────────────────────────────────────────────────────────────────┐
│           PERFORM A PLURALITY OF READ OPERATIONS OF THE QUBIT       │
│                                  104                                │
│                                                                     │
│     ┌───────────────────────────────────────────────────────────┐   │
│     │   PERFORM A PREDETERMINED NUMBER OF READ OPERATIONS OF THE QUBIT │
│     │                            106                            │   │
│     └───────────────────────────────────────────────────────────┘   │
│                                                                     │
│     ┌───────────────────────────────────────────────────────────┐   │
│     │ REPEATEDLY PERFORM READ OPERATIONS OF THE QUBIT UNTIL EXPIRATION OF A │
│     │             PREDETERMINED TIME INTERVAL                   │   │
│     │                            108                            │   │
│     └───────────────────────────────────────────────────────────┘   │
│                                                                     │
│     ┌───────────────────────────────────────────────────────────┐   │
│     │    DETERMINE A CONFIDENCE INDICATOR FOR AN OUTCOME OF EACH READ │
│     │   OPERATION OF THE PLURALITY OF READ OPERATIONS FOR THE QUBIT │
│     │                            110                            │   │
│     └───────────────────────────────────────────────────────────┘   │
│                                                                     │
│     ┌───────────────────────────────────────────────────────────┐   │
│     │ REPEATEDLY PERFORM READ OPERATIONS OF THE QUBIT UNTIL THE CONFIDENCE │
│     │         INDICATOR EXCEEDS A CONFIDENCE THRESHOLD          │   │
│     │                            112                            │   │
│     └───────────────────────────────────────────────────────────┘   │
└─────────────────────────────────────────────────────────────────────┘
```

PERFORMING FILE DIFFERENTIAL OPERATIONS ON QUANTUM FILES IN A STATE OF SUPERPOSITION

BACKGROUND

Quantum computing involves the use of quantum bits, referred to herein as "qubits," each of which has properties (such as superposition and entanglement) that differ from those of non-quantum bits used in classical computing. As quantum computing continues to increase in popularity and become more commonplace, an ability to programmatically manipulate quantum files comprising a plurality of qubits will be desirable.

SUMMARY

The examples disclosed herein implement a quantum file management system that performs file difference operations on quantum files in a state of superposition. The term "file difference operation" and derivatives thereof are used herein to refer to operations for identifying differences between the contents of two quantum files, including but not limited to indicating data values found in the same locations in both quantum files, (i.e., the same data values stored in corresponding qubits), data values found exclusively in one or the other of the quantum files, and/or data values found in both quantum files but in different locations. To perform a file difference operation, a quantum file difference service, executing on a processor device of a quantum computing device, accesses a first plurality of data values of a first plurality of qubits for a first quantum file, as well as a second plurality of data values of a second plurality of qubits for a second quantum file. The first plurality of qubits and the second plurality of qubits are in a state of superposition, such that consecutive read operations on each qubit may result in different outcomes. Thus, a plurality of read operations are performed on each qubit of the first plurality of qubits and the second plurality of qubits to determine a corresponding first plurality of data values and a second plurality of data values. The plurality of read operations may be performed by, as non-limiting examples, performing a specified number of read operations, repeatedly performing read operations until expiration of a predetermined time interval, or repeatedly performing read operations until a desired confidence level is reached. A file difference operation is then performed using the first plurality of data values and the second plurality of data values, and a result is generated based on the file difference operation.

In another example, a method for performing file difference operations on quantum files in a state of superposition is disclosed. The method comprises accessing, by a quantum computing device, a first plurality of data values for a first plurality of qubits of a first quantum file and a second plurality of data values for a second plurality of qubits of a second quantum file, wherein the first plurality of qubits and the second plurality of qubits are in a state of superposition. Accessing the first plurality of data values and the second plurality of data values comprises, for each qubit in the first plurality of qubits and the second plurality of qubits, performing a plurality of read operations of the qubit, and determining a data value for the qubit based on the plurality of read operations. The method further comprises performing a file difference operation using the first plurality of data values and the second plurality of data values. The method also comprises generating a result based on the file difference operation.

In another example, a quantum computing device for performing file difference operations on quantum files in a state of superposition is disclosed. The quantum computing device comprises a system memory and a processor device coupled to the system memory. The processor device is to access a first plurality of data values for a first plurality of qubits of a first quantum file and a second plurality of data values for a second plurality of qubits of a second quantum file, wherein the first plurality of qubits and the second plurality of qubits are in a state of superposition. To access the first plurality of data values and the second plurality of data values is to, for each qubit in the first plurality of qubits and the second plurality of qubits, perform a plurality of read operations of the qubit, and determine a data value for the qubit based on the plurality of read operations. The processor device is further to perform a file difference operation using the first plurality of data values and the second plurality of data values. The processor device is also to generate a result based on the file difference operation.

In another example, a computer program product is provided. The computer program product comprises a non-transitory computer-readable medium having stored thereon computer-executable instructions which, when executed, cause a processor device to access a first plurality of data values for a first plurality of qubits of a first quantum file and a second plurality of data values for a second plurality of qubits of a second quantum file, wherein the first plurality of qubits and the second plurality of qubits are in a state of superposition. To access the first plurality of data values and the second plurality of data values is to, for each qubit in the first plurality of qubits and the second plurality of qubits, perform a plurality of read operations of the qubit, and determine a data value for the qubit based on the plurality of read operations. The computer-executable instructions further cause the processor device to perform a file difference operation using the first plurality of data values and the second plurality of data values. The computer-executable instructions also cause the processor device to generate a result based on the file difference operation.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum file" and "second quantum file," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties that differ from those of classical (i.e., non-quantum) bits used in classical computing. In particular, a qubit may be placed in a state, referred to herein as "superposition," in which a feature or attribute of the qubit (such as, e.g., spin) may exist simultaneously in multiple separate quantum states. The attribute of the qubit in a state of superposition has a finite chance of being in any one of the multiple quantum states until a point in time at which the attribute is measured, at which point the attribute is observed to be in a specific quantum state. If the qubit's attribute is used to encode a data value stored by the qubit, such data value may vary with each subsequent observation of the attribute, but over multiple observations the data value is likely to tend towards a consistent result in accordance with the statistical likelihood of the possible quantum states. Thus, as quantum computing continues to increase in popularity and become more commonplace, an ability to programmatically manipulate quantum files in general, and specifically to perform file differential operations on quantum files in a state of superposition, will be desirable.

In this regard, examples disclosed herein implement a quantum file management system that performs file difference operations on quantum files in a state of superposition. The term "file difference operation" and derivatives thereof are used herein to refer to operations for identifying differences between the contents of two quantum files, including but not limited to indicating data values found in the same locations in both quantum files, (i.e., the same data values stored in corresponding qubits), data values found exclusively in one or the other of the quantum files, and/or data values found in both quantum files but in different locations. To perform a file difference operation, a quantum file difference service, executing on a processor device of a quantum computing device, accesses a first plurality of data values of a first plurality of qubits for a first quantum file, as well as a second plurality of data values of a second plurality of qubits for a second quantum file. The first plurality of qubits and the second plurality of qubits are in a state of superposition, such that consecutive read operations on each qubit may result in different outcomes. Thus, a plurality of read operations are performed on each qubit of the first plurality of qubits and the second plurality of qubits to determine a corresponding first plurality of data values and a second plurality of data values. The plurality of read operations may be performed by, as non-limiting examples, performing a specified number of read operations, repeatedly performing read operations until expiration of a predetermined time interval, or repeatedly performing read operations until a desired confidence level is reached. A file difference operation is then performed using the first plurality of data values and the second plurality of data values, and a result is generated based on the file difference operation.

Figure 1:
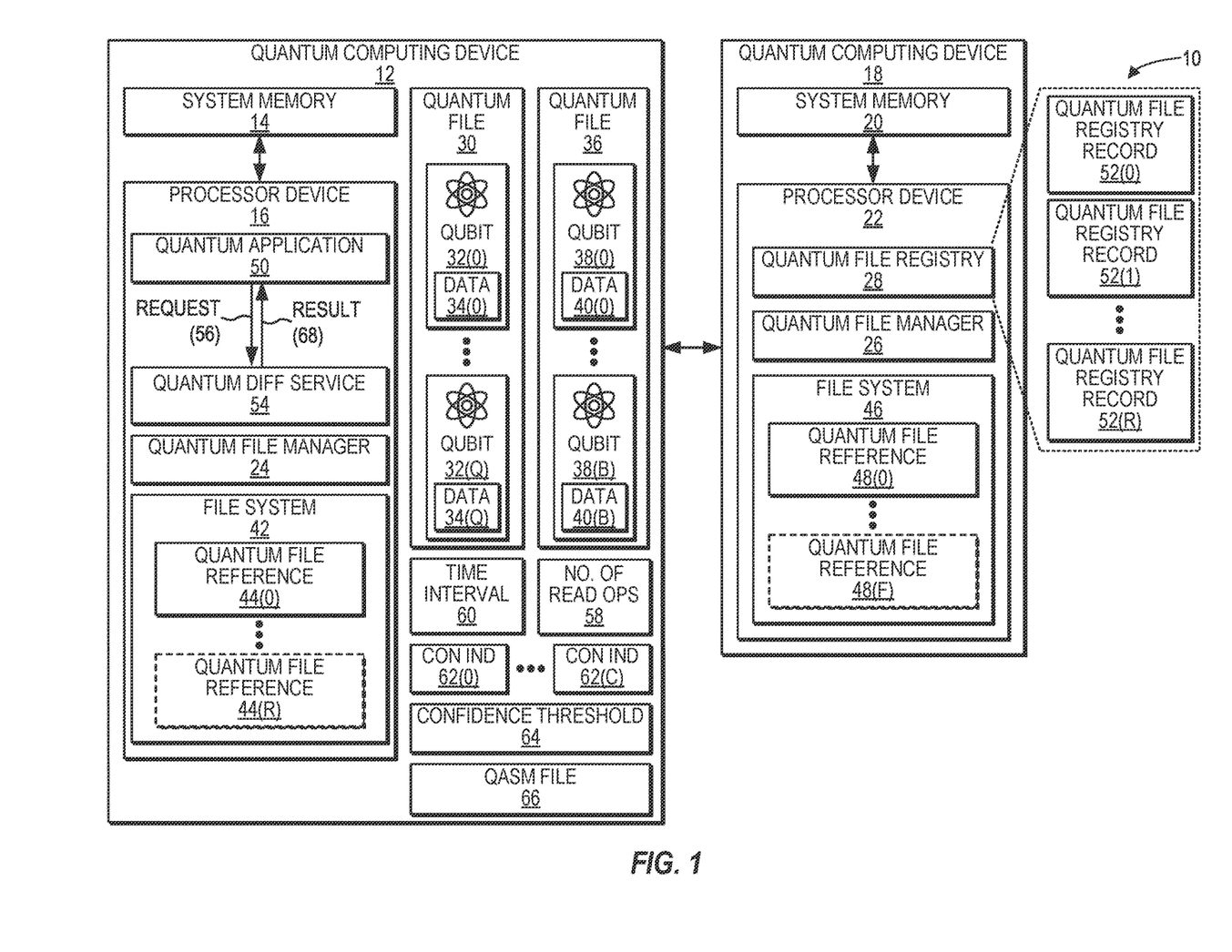
FIG. 1 is a block diagram of a quantum computing system in which examples may be practiced.

FIG. 1 is a block diagram of a quantum computing system 10 according to one example. The quantum computing system 10 includes a quantum computing device 12 that comprises a system memory 14 and a processor device 16, and also includes a quantum computing device 18 that includes a system memory 20 and a processor device 22. It is to be understood that the quantum computing system 10 according to some examples may include other classical computing devices and/or additional quantum computing devices that are not illustrated in FIG. 1. Additionally, the quantum computing device 12 and the quantum computing device 18 in some examples may include constituent elements in addition to those illustrated in FIG. 1.

The quantum computing device 12 and the quantum computing device 18 in the example of FIG. 1 may be close in physical proximity to one another or may be relatively long distances from one another (e.g., hundreds or thousands of miles from one another). The quantum computing device 12 and the quantum computing device 18 operate in quantum environments but can operate using classical computing principles or quantum computing principles. When using quantum computing principles, the quantum computing device 12 and the quantum computing device 18 perform computations that utilize quantum-mechanical phenomena, such as superposition and/or entanglement states. The quantum computing device 12 and the quantum computing device 18 each may operate under certain environmental conditions, such as at or near zero degrees (0°) Kelvin. When using classical computing principles, the quantum computing device 12 and the quantum computing device 18 utilize binary digits that have a value of either zero (0) or one (1). The quantum computing device 12 and the quantum computing device 18 may be communicatively coupled via a conventional classical network connection (not shown) and/or via a quantum channel (not shown) over which qubits may be transmitted.

The quantum computing device 12 and the quantum computing device 18 of FIG. 1 together implement a quantum file management system, components of which are distributed among one or more of the quantum computing device 12 and the quantum computing device 18. The quantum file management system includes quantum file managers 24 and 26, which operate to implement quantum files on the quantum computing device 12 and the quantum computing device 18, respectively. The quantum file management system also includes a quantum file registry 28 that includes metadata regarding each quantum file implemented in the quantum computing system 10, as discussed in greater detail below.

In the example of FIG. 1, the quantum computing system 10 implements a quantum file 30 that is made up of a plurality of qubits 32(0)-32(Q) that are in a state of superposition. The qubits 32(0)-32(Q) store a corresponding plurality of data values ("DATA") 34(0)-34(Q). The quantum computing system 10 also implements a quantum file 36 that is made up of a plurality of qubits 38(0)-38(B) that stores a corresponding plurality of data values ("DATA") 40(0)-40(B), and that are also in a state of superposition. For purposes of this example, the quantum files 30 and 36 are "owned" by the quantum computing device 12. However, it is to be understood that ownership of the quantum files 30 and 36 may be migrated or transitioned from one quantum computing device to another. It is to be further understood that the quantum files 30 and 36 in some examples may comprise more qubits than illustrated in FIG. 1.

The quantum computing device 12 includes a file system 42 that includes one or more quantum file references 44(0)-44(R). Each of the quantum file references 44(0)-44(R) corresponds to a quantum file that is maintained in the quantum file registry 28 and that is "owned" by the quantum computing device 12. Thus, for example, the quantum file reference 44(0) may correspond to the quantum file 30. Likewise, the quantum computing device 18 includes a file system 46 that includes one or more quantum file references 48(0)-48(F). It is to be understood that the file system 46 provides functionality corresponding to the functionality of the file system 42 described herein.

In exemplary operation, a quantum file such as the quantum file 30 may be accessed by a requestor (e.g., a quantum application 50) via the quantum file reference 44(0), which is identified by the quantum application 50 via an identifier (not shown). The quantum application 50 provides the identifier to the quantum file manager 24 via any suitable inter-process communications mechanism, such as an application programming interface (API) or the like. In some examples, the quantum file manager 24 may be an integral part of a quantum operating system, and the appropriate intercommunication mechanisms between the quantum application 50 and the quantum file manager 24 may be generated in response to certain programming instructions, such as reading, writing, or otherwise accessing the quantum file 30 while the quantum application 50 is being compiled.

The quantum file manager 24 then accesses the file system 42. Based on the quantum file identifier provided by the quantum application 50, the quantum file manager 24 accesses the quantum file reference 44(0). The quantum file reference 44(0) includes information about the quantum file 30 such as an internal quantum file identifier for the quantum file 30, a location of a Quantum Assembly Language (QASM) file that contains programming instructions that access the quantum file 30, and/or metadata for the quantum file 30 (e.g., a creation timestamp of the quantum file 30, a last modification timestamp of the quantum file 30, and/or a current user of the quantum file 30, as non-limiting examples). The quantum file reference 44(0) may also identify each qubit that makes up the quantum file 30 (i.e., the qubits 32(0)-32(Q), in this example).

In some examples, data may be spread over the qubits 32(0)-32(Q) of the quantum file 30 in a manner that dictates that the qubits 32(0)-32(Q) must be accessed in some sequential order for the data to have contextual meaning. Accordingly, some examples may provide that the order in which the qubits 32(0)-32(Q) are identified in the quantum file reference 44(0) may correspond to the appropriate order in which the qubits 32(0)-32(Q) should be accessed. In other examples, the quantum file reference 44(0) may have one or more additional fields identifying the appropriate order. Some examples may also provide that the quantum file reference 44(0) includes qubit entanglement status fields that indicate entanglement status information about the qubits 32(0)-32(Q), quantum superposition status fields that indicate superposition status information about the qubits 32(0)-32(Q), and/or superdense status fields that indicate superdense status information about the qubits 32(0)-32(Q). It is to be understood that the quantum file references 44(0)-44(R) also include a quantum file reference that stores similar information for the quantum file 36 and the qubits 38(0)-38(B).

In the example of FIG. 1, the quantum file manager 24, upon receiving an access request to a quantum file such as the quantum file 30, may access the quantum file registry 28 (using, e.g., a linking service (not shown)) to determine a current status of the quantum file 30. The quantum file registry 28 of FIG. 1 comprises a plurality of quantum file registry records 52(0)-52(R), each of which corresponds to a quantum file implemented in the quantum computing system 10. In this example, the quantum file registry record 52(0) corresponds to the quantum file 30, while the quantum file registry record 52(1) corresponds to the quantum file 36.

Each of the quantum file registry records 52(0)-52(R) includes current metadata regarding the corresponding quantum files such as the quantum files 30 and 36. The metadata may include, as non-limiting examples, an internal file identifier of each corresponding quantum file, an indicator of a number of qubits that make up the corresponding quantum file, and, for each qubit of the number of qubits, a qubit identification field and an entanglement status field. The quantum file registry records 52(0)-52(R) each may also include additional metadata, such as, by way of non-limiting example, a creation timestamp of the corresponding quantum file, a last modification timestamp of the corresponding quantum file, a current user (e.g., current quantum application or current quantum service) of the corresponding quantum file, and the like. Some examples may also provide that the quantum file registry records 52(0)-52(R) each further include qubit entanglement status fields, quantum superposition status fields, and/or superdense status fields for each qubit of the corresponding quantum file.

The quantum file manager 24 updates the quantum file reference 44(0) with the information from the quantum file registry record 52(0) and the outcome of any checks, and also updates the timestamp field of the quantum file reference 44(0) with the current time. The quantum file manager 24 then returns control to the quantum application 50, passing the quantum application 50 at least some of the updated information contained in the quantum file reference 44(0). The quantum application 50 may then initiate actions against the qubits 32(0)-32(Q), such as read actions, write actions, or the like.

One function provided by the quantum file managers 24 and 26 of FIG. 1 is file difference operations to identify differences between two quantum files such as the quantum files 30 and 36. For instance, in one possible use case, the quantum file 36 may comprise a modified copy of the quantum file 30, and a user may seek to identify any changes made to the quantum file 36 relative to the quantum file 30. Accordingly, in the example of FIG. 1, the quantum computing device 12 implements a quantum file difference service ("QUANTUM DIFF SERVICE") 54 that provides quantum file difference functionality. The quantum file difference service 54 is executed by the processor device 16, and receives a request 56 from a requestor, such as the quantum application 50, to perform a file difference operation.

In some examples, the request 56 may include file identifiers (not shown) that identify the quantum files 30 and 36 as the quantum files on which the file difference operation is to be performed. In such examples, upon receiving the request 56, the quantum file difference service 54 uses the file identifiers to access quantum file registry records for the quantum files on which the file difference operation is to be performed. In the example of FIG. 1, the quantum file difference service 54 accesses the quantum file registry record 52(0) corresponding to the quantum file 30, and similarly may access the quantum file registry record 52(1) corresponding to the quantum file 36. The quantum file difference service 54 then uses the quantum file registry record 52(0) to identify the plurality of qubits 32(0)-32(Q) of the quantum file 30, and also to identify a location of each of the qubits 32(0)-32(Q). Likewise, the quantum file difference service 54 uses the quantum file registry record 52(1) to identify the plurality of qubits 38(0)-38(B) of the quantum file 36, and further to identify a location of each of the qubits 38(0)-38(B).

The quantum file difference service 54 then accesses the data values 34(0)-34(Q) stored in the qubits 32(0)-32(Q) and the data values 40(0)-40(B) stored in the qubits 38(0)-38(B) to perform the file difference operation. However, as noted above, the qubits 32(0)-32(Q) and the qubits 38(0)-38(B) are in a state of superposition, and thus consecutive read operations to each of the qubits 32(0)-32(Q) and the qubits 38(0)-38(B) may produce difference outcomes for each of the data values 34(0)-34(Q) and the data values 40(0)-40(B). Accordingly, the quantum file difference service 54 accesses each of the data values 34(0)-34(Q) and 40(0)-40(B) by performing a plurality of read operations on each of the qubits 32(0)-32(Q) and 38(0)-38(B), and determining each of the data values 34(0)-34(Q) and 40(0)-40(B) based on the plurality of read operations.

For example, the quantum file difference service 54 may track the outcomes of each read operation on each of the qubits 32(0)-32(Q) and 38(0)-38(B), and may use a most commonly occurring outcome for each of the qubits 32(0)-32(Q) and 38(0)-38(B) as the data values 34(0)-34(Q) and 40(0)-40(B). According to some examples, performing the plurality of read operations may be accomplished by the quantum file difference service 54 performing a predetermined number 58 of read operations (captioned "NO. OF READ OPS" in FIG. 1) on each of the qubits 32(0)-32(Q) and 38(0)-38(B). Some examples may provide that performing the plurality of read operations may comprise repeatedly performing read operations of the qubit until expiration of a predetermined time interval (captioned "TIME INTERVAL" in FIG. 1) 60 (i.e., performing as many read operations as possible within the predetermined time interval 60).

In some examples, the quantum file difference service 54 may provide confidence indicators (captioned "CON IND" in FIG. 1) 62(0)-62(C) to track a confidence level for the outcome of each read operation of the plurality of read operations for each of the qubits 32(0)-32(Q) and 38(0)-38(B). For example, the confidence indicators 62(0)-62(C) each may indicate a percentage of time that a given outcome resulted from a read operation to one of the qubits 32(0)-32(Q) and 38(0)-38(B). The data values 34(0)-34(Q) and 40(0)-40(B) corresponding to the qubits 32(0)-32(Q) and 38(0)-38(B) may then be determined as the outcomes corresponding with the confidence indicators 62(0)-62(C) having the highest values. When performing the read operations, some examples may provide that the quantum file difference service 54 repeatedly performs read operations on each of the qubits 32(0)-32(Q) and 38(0)-38(B) until a corresponding confidence indicator of the confidence indicators 62(0)-62(C) exceeds a confidence threshold 64.

Some examples may provide that the quantum file difference service 54 may make use of a QASM file 66 for a qubit of the qubits 32(0)-32(Q) and 38(0)-38(B) when determining the corresponding data value for the qubit. The QASM file 66 may define an initial state for the qubit, which the quantum file difference service 54 may take into consideration if, for example, the results of the plurality of read operations on the qubit provide inconclusive outcomes.

After accessing the data values 34(0)-34(Q) stored in the qubits 32(0)-32(Q) and the data values 40(0)-40(B) stored in the qubits 38(0)-38(B), the quantum file difference service 54 next performs a file difference operation using the plurality of data values 34(0)-34(Q) and the plurality of data values 40(0)-40(B). The file difference operation may be performed in a manner analogous to conventional bitwise file difference operations, as non-limiting examples. The quantum file difference service 54 then generates a result 68 based on the file difference operation. The result 68 may comprise, for example, an indication of a difference between a first data value of the first plurality of data values 34(0)-34(Q) and a corresponding second data value of the second plurality of data values 40(0)-40(B). In some examples, the result 68 may also include one or more of the confidence indicators 62(0)-62(C), which may provide additional context regarding any indicated matches or mismatches among the data values 34(0)-34(Q) and the data values 40(0)-40(B).

Some examples may provide that, before performing a file difference operation, one or more checks are performed on the qubits 32(0)-32(Q) and 38(0)-38(B). For example, the quantum file difference service 54 may first ensure that each of the qubits 32(0)-32(Q) and 38(0)-38(B) of the quantum files 30 and 36, respectively, are not entangled (i.e., are in an entanglement state of "not entangled"). Some examples may provide that the quantum file difference service 54 also obtains exclusive access to the qubits 32(0)-32(Q) and 38(0)-38(B) before attempting the file difference operation. Obtaining exclusive access may comprise operations for ensuring that no other processes are operating on the qubits 32(0)-32(Q) and 38(0)-38(B), and/or indicating that access to the qubits 32(0)-32(Q) and 38(0)-38(B) is locked to other processes while the file difference operation is underway.

Figure 2A:
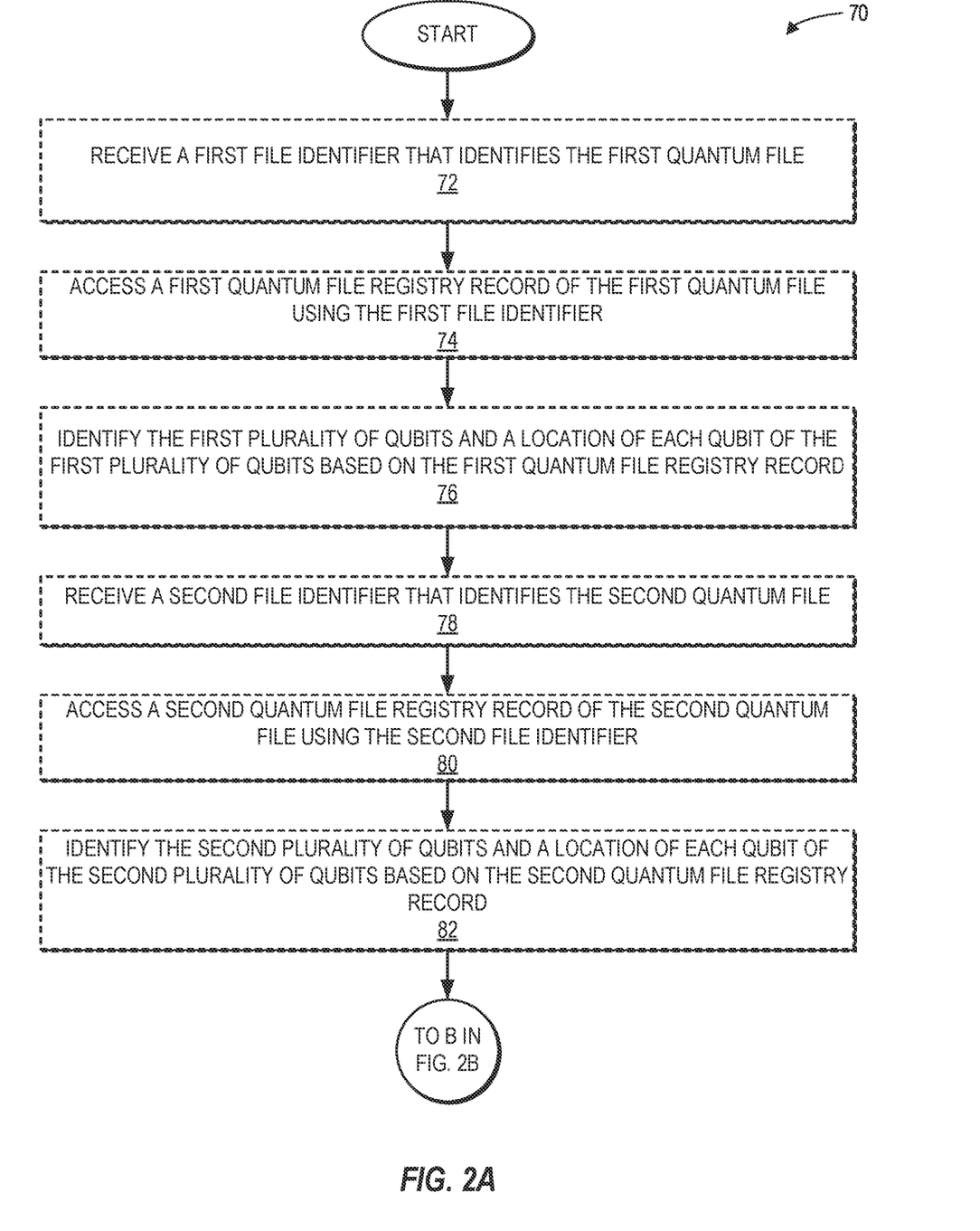
FIGS. 2A-2C are flowcharts illustrating operations for performing file difference operations on quantum files in a state of superposition, according to one example.
Figure 2B:
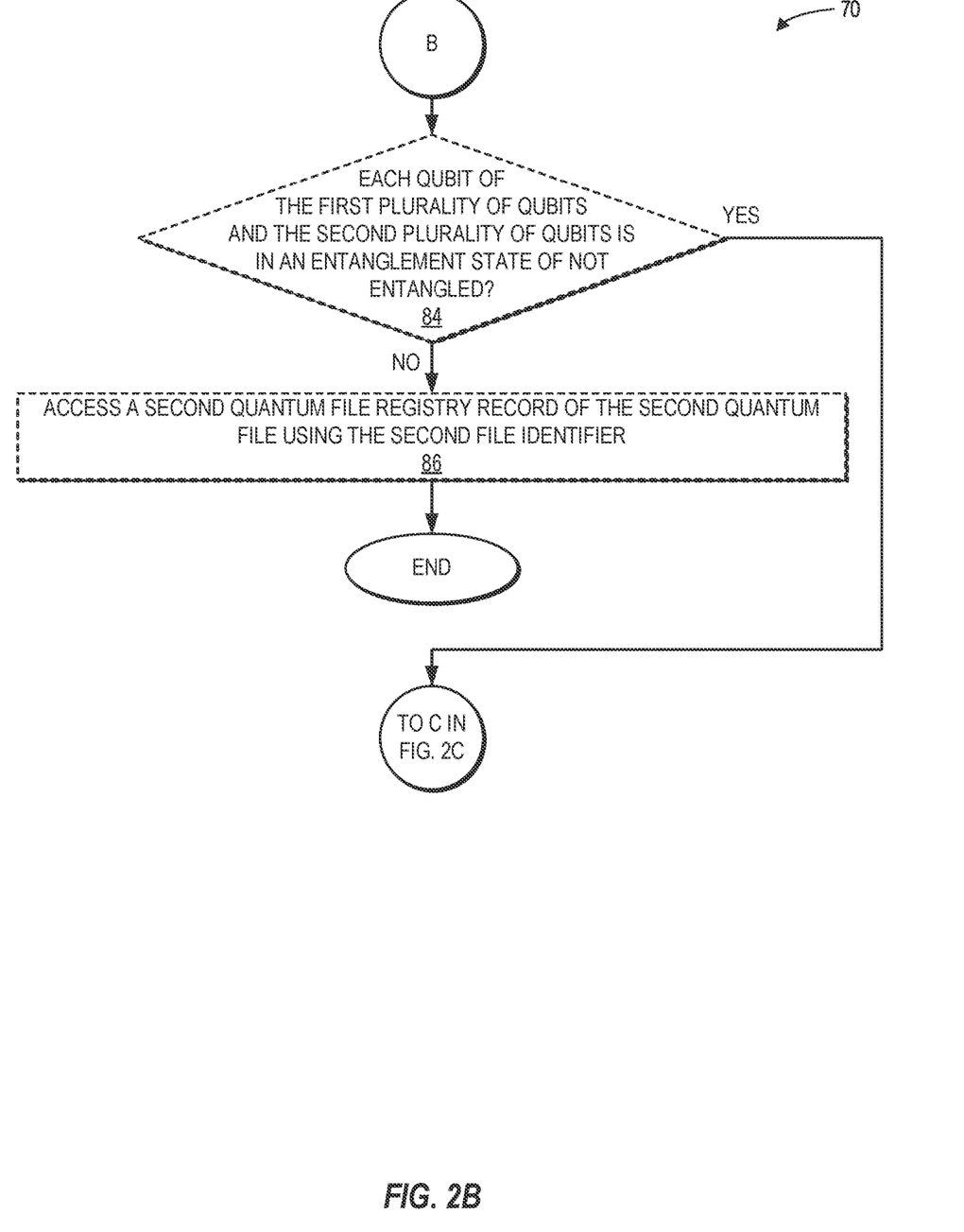
Figure 2C:
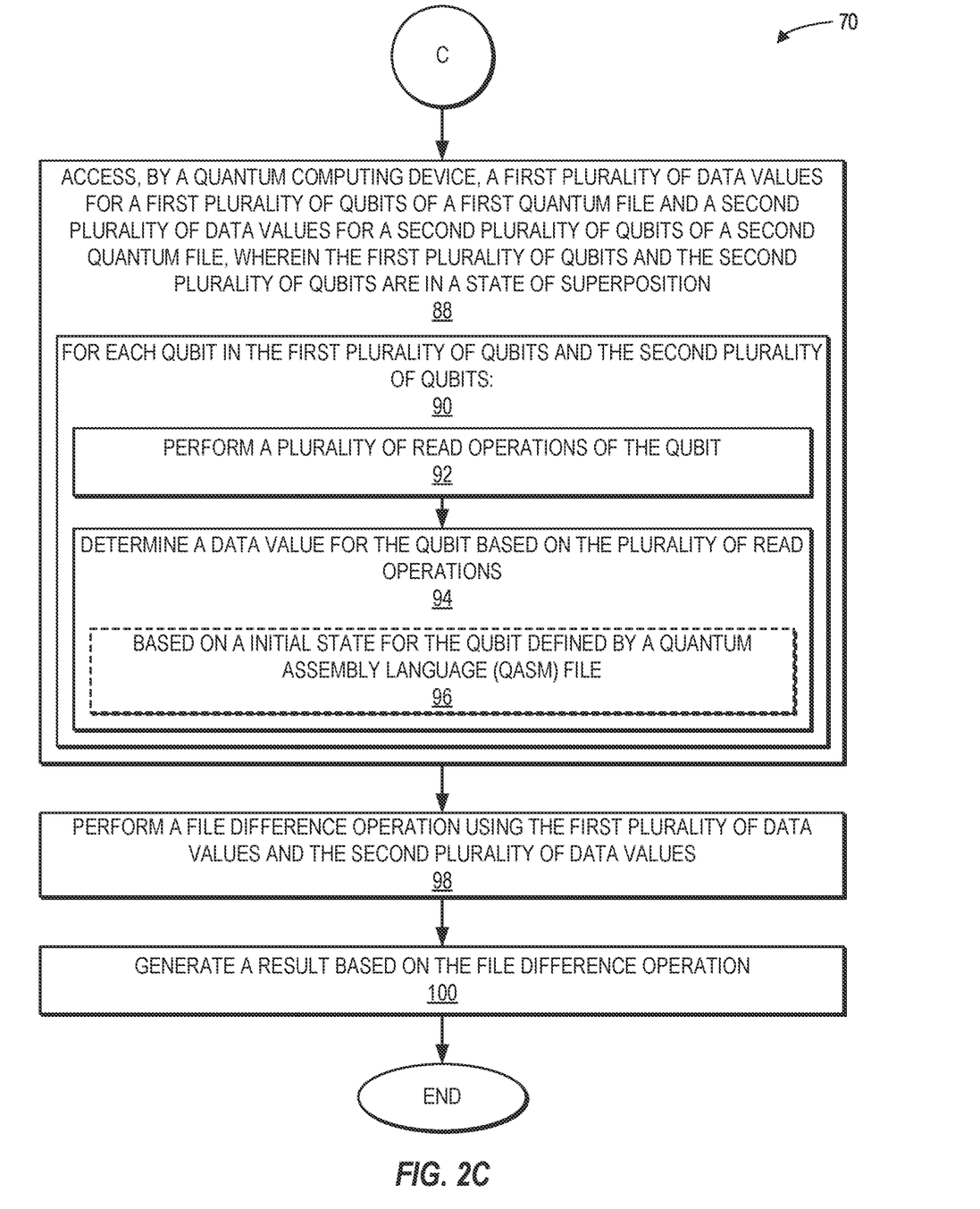

To illustrate exemplary operations of the quantum computing device 12 of FIG. 1 for performing file difference operations on quantum files in a state of superposition, FIGS. 2A-2C provide a flowchart 70. Elements of FIG. 1 are referenced in describing FIGS. 2A-2C for the sake of clarity. In FIG. 2A, operations according to some examples begin with the quantum computing device 12 (e.g., by executing the quantum file difference service 54 using the processor device 16) receiving a first file identifier that identifies a first quantum file, such as the quantum file 30 of FIG. 1 (block 72). The quantum computing device 12 accesses a first quantum file registry record (e.g., the quantum file registry record 52(0) of FIG. 1) of the first quantum file 30 using the first file identifier (block 74). Based on the first quantum file registry record 52(0), the quantum computing device 12 identifies a first plurality of qubits, such as the plurality of qubits 32(0)-32(Q) of FIG. 1, and a location of each qubit of the first plurality of qubits 32(0)-32(Q) (block 76).

The quantum computing device 12 also receives a second file identifier that identifies a second quantum file (e.g., the quantum file 36 of FIG. 1) (block 78). The quantum computing device 12 accesses a second quantum file registry record (e.g., the quantum file registry record 52(1) of FIG. 1) of the second quantum file 36 using the second file identifier (block 80). The quantum computing device 12 then identifies a second plurality of qubits, such as the plurality of qubits 38(0)-38(B) of FIG. 1, and a location of each qubit of the second plurality of qubits 38(0)-38(B) based on the second quantum file registry record 52(1) (block 82). Operations then continue at block 84 of FIG. 2B.

Referring now to FIG. 2B, some examples may provide that the quantum computing device 12 determines whether each qubit of the first plurality of qubits 32(0)-32(Q) and the second plurality of qubits 38(0)-38(B) is in an entanglement state of not entangled (block 84). If not (i.e., if any of the qubits of the first plurality of qubits 32(0)-32(Q) and the second plurality of qubits 38(0)-38(B) are entangled), the file difference operation is aborted (block 86). Otherwise, if the quantum computing device 12 determines at decision block 84 that each qubit of the first plurality of qubits 32(0)-32(Q) and the second plurality of qubits 38(0)-38(B) is in an entanglement state of not entangled, operations continue at block 88 of FIG. 2C.

Referring now to FIG. 2C, the quantum computing device 12 accesses a first plurality of data values (e.g., the plurality of data values 34(0)-34(Q) of FIG. 1) for the first plurality of qubits 32(0)-32(Q) of the first quantum file 30 and a second plurality of data values (e.g., the plurality of data values 40(0)-40(B) of FIG. 1) for the second plurality of qubits 38(0)-38(B) of the second quantum file 36, wherein the first plurality of qubits 32(0)-32(Q) and the second plurality of qubits 38(0)-38(B) are in a state of superposition (block 88). The operations of block 88 for accessing the first plurality of data values 34(0)-34(Q) and the second plurality of data values 40(0)-40(B) include a sequence of operations performed for each qubit in the first plurality of qubits 32(0)-32(Q) and the second plurality of qubits 38(0)-38(B) (block 90). The quantum computing device 12 performs a plurality of read operations of the qubit (block 92). Exemplary operations that may be performed as part of performing the plurality of read operations of block 92 are discussed below in greater detail with respect to FIG. 3. The quantum computing device 12 then determines a data value for the qubit based on the plurality of read operations (block 94). In some examples, the operations of block 94 for determining the data value for the qubit may be further based on an initial state for the qubit defined by a QASM file such as the QASM file 66 of FIG. 1 (block 96).

The quantum computing device 12 next performs a file difference operation using the first plurality of data values 34(0)-34(Q) and the second plurality of data values 40(0)-40(B) (block 98). The quantum computing device 12 then generates a result (e.g., the result 68 of FIG. 1) based on the file difference operation (block 100).

Figure 3:
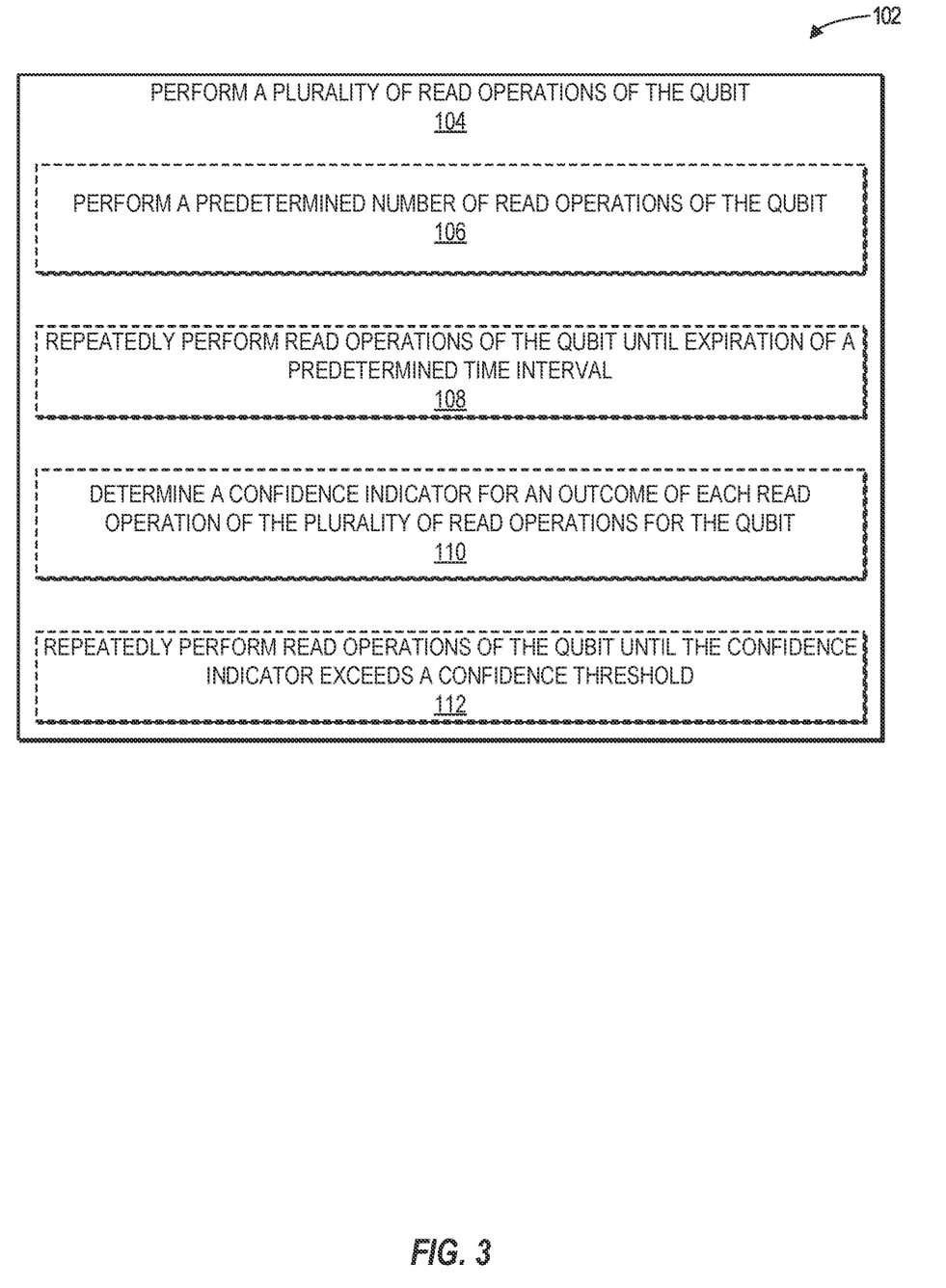
FIG. 3 is a flowchart illustrating additional exemplary operations for performing a plurality of read operations of a qubit in a state of superposition, according to one example.

To illustrate exemplary operations that may be performed by the quantum computing device 12 of FIG. 1 when performing a plurality of read operations on a qubit according to some examples, FIG. 3 provides a flowchart 102. In FIG. 3, the quantum computing device 12 performs a plurality of read operations of the qubit (block 104). It is to be understood that the operations of block 104 correspond to the operations of block 92 of FIG. 2C. In some examples, the operations of block 104 for performing the plurality of read operations of the qubit may comprise performing the predetermined number 58 of read operations of the qubit (block 106). Some examples may provide that the operations of block 104 for performing the plurality of read operations of the qubit comprise repeatedly performing read operations of the qubit until expiration of the predetermined time interval 60 (block 108).

According to some examples, the quantum computing device 12 may perform the operations of block 104 for performing the plurality of read operations of the qubit by determining a confidence indicator, such as the confidence indicators 62(0)-62(C) of FIG. 1, for an outcome of each read operation of the plurality of read operations for the qubit (block 110). In some examples, the quantum computing device 12 may then repeatedly perform read operations of the qubit until a corresponding confidence indicator, such as the confidence indicators 62(0)-62(C), exceeds a confidence threshold 64 (block 112).

Figure 4:
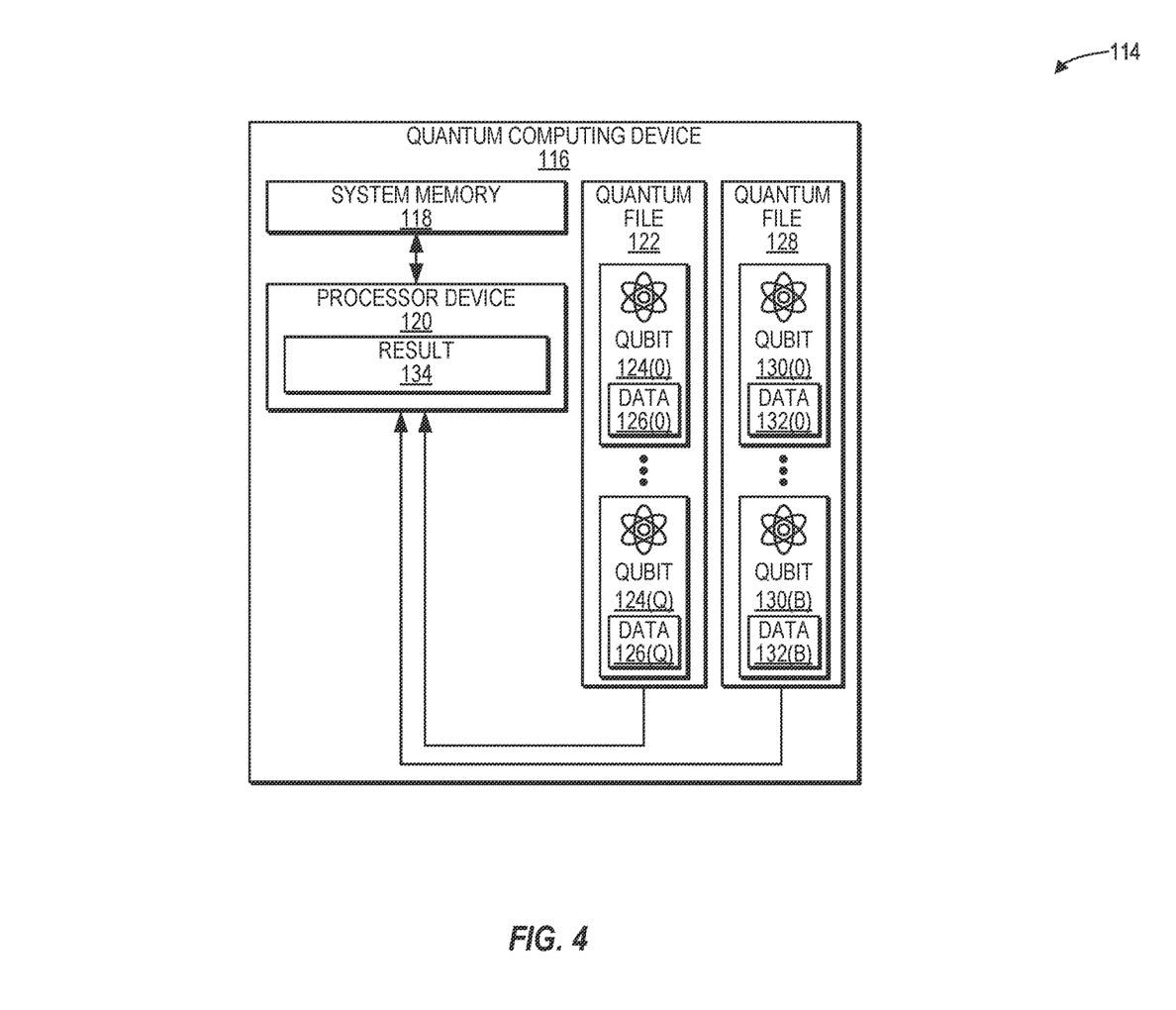
FIG. 4 is a simpler block diagram of the quantum computing device of FIG. 1 for performing file difference operations on quantum files in a state of superposition, according to one example.

FIG. 4 is a simpler block diagram of the quantum computing system 10 of FIG. 1 for performing file difference operations on quantum files in a state of superposition, according to one example. In the example of FIG. 4, the quantum computing system 114 includes a quantum computing device 116 that comprises a system memory 118 and a processor device 120. The quantum computing system 114 implements a quantum file 122 that is made up of a plurality of qubits 124(0)-124(Q) that are in a state of superposition. The qubits 124(0)-124(Q) store a corresponding plurality of data values ("DATA") 126(0)-126(Q). The quantum computing system 114 also implements a quantum file 128 that is made up of a plurality of qubits 130(0)-130(B) that stores a corresponding plurality of data values ("DATA") 132(0)-132(B), and that are also in a state of superposition.

The quantum computing device 116 accesses the data values 126(0)-126(Q) stored in the qubits 124(0)-124(Q) and the data values 132(0)-132(B) stored in the qubits 130(0)-130(B) to perform a file difference operation by performing a plurality of read operations on each of the qubits 124(0)-124(Q) and 130(0)-130(B), and determining each of the data values 126(0)-126(Q) and 132(0)-132(B) based on the plurality of read operations. After accessing the data values 126(0)-126(Q) stored in the qubits 124(0)-124(Q) and the data values 132(0)-132(B) stored in the qubits 130(0)-130(B), the quantum computing device 116 next performs a file difference operation using the data values 126(0)-126(Q) and the data values 132(0)-132(B). The file difference operation may be performed in a manner analogous to conventional bitwise file difference operations, as non-limiting examples. The quantum computing device 116 then generates a result 134 based on the file difference operation.

Figure 5:
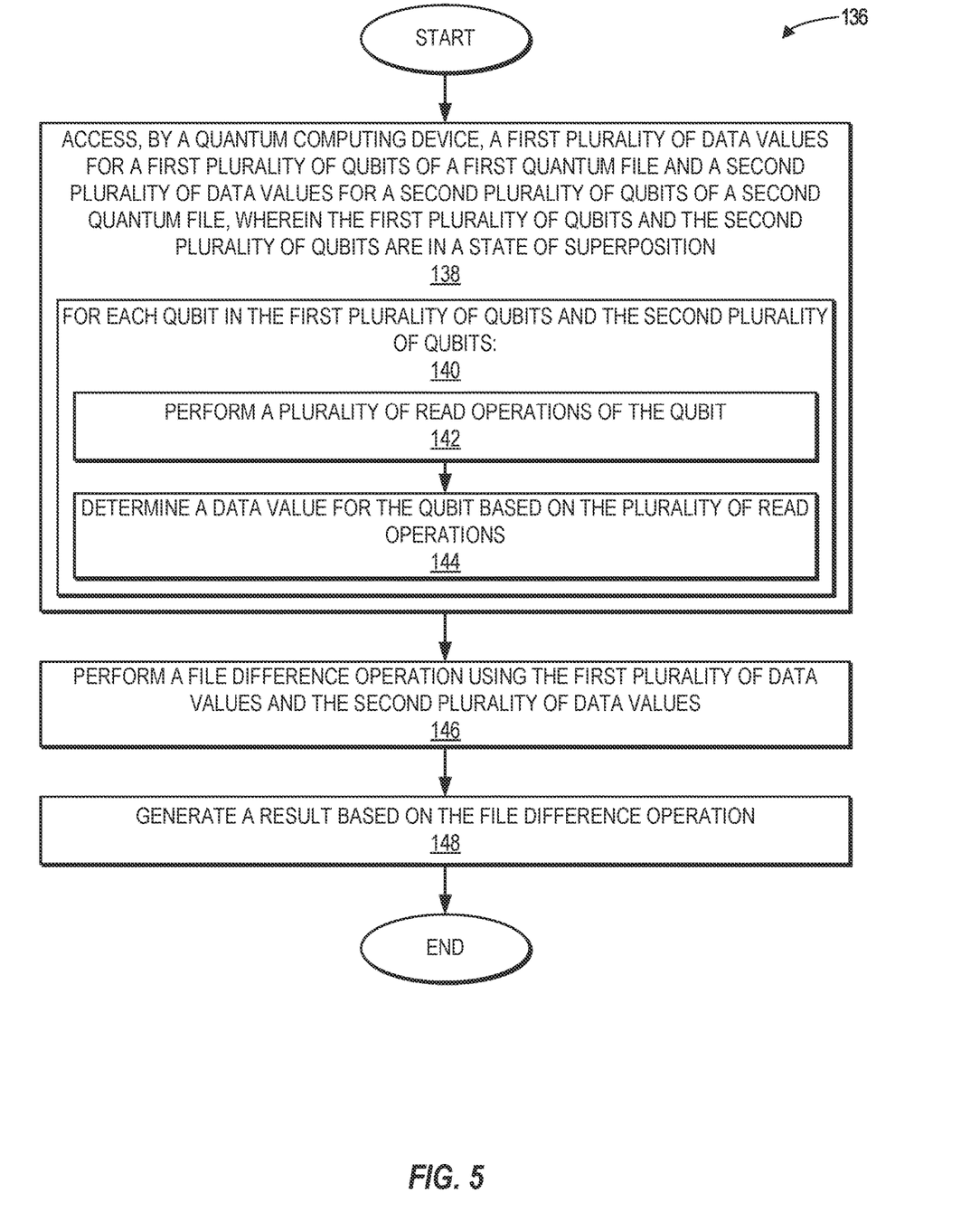
FIG. 5 is a flowchart of a simplified method for performing file difference operations on quantum files in a state of superposition in the quantum computing device of FIG. 4, according to one example.

FIG. 5 provides a flowchart 136 of a simplified method for performing file difference operations on quantum files in a state of superposition in the quantum computing system 114 of FIG. 4, according to one example. For the sake of clarity, elements of FIG. 4 are referenced in describing FIG. 5. In FIG. 5, operations begin with the quantum computing device 116 accessing a first plurality of data values (e.g., the plurality of data values 126(0)-126(Q) of FIG. 4) for the first plurality of qubits 124(0)-124(Q) of the first quantum file 122 and a second plurality of data values (e.g., the plurality of data values 132(0)-132(B) of FIG. 4) for the second plurality of qubits 130(0)-130(B) of the second quantum file 128, wherein the first plurality of qubits 124(0)-124(Q) and the second plurality of qubits 130(0)-130(B) are in a state of superposition (block 138).

The operations of block 138 for accessing the first plurality of data values 126(0)-126(Q) and the second plurality of data values 132(0)-132(B) include a sequence of operations performed for each qubit in the first plurality of qubits 124(0)-124(Q) and the second plurality of qubits 130(0)-

130(B) (block 140). The quantum computing device 116 performs a plurality of read operations of the qubit (block 142). The quantum computing device 116 then determines a data value for the qubit based on the plurality of read operations (block 144). The quantum computing device 116 next performs a file difference operation using the first plurality of data values 126(0)-126(Q) and the second plurality of data values 132(0)-132(B) (block 146). The quantum computing device 116 then generates a result (e.g., the result 134 of FIG. 4) based on the file difference operation (block 148).

Figure 6:
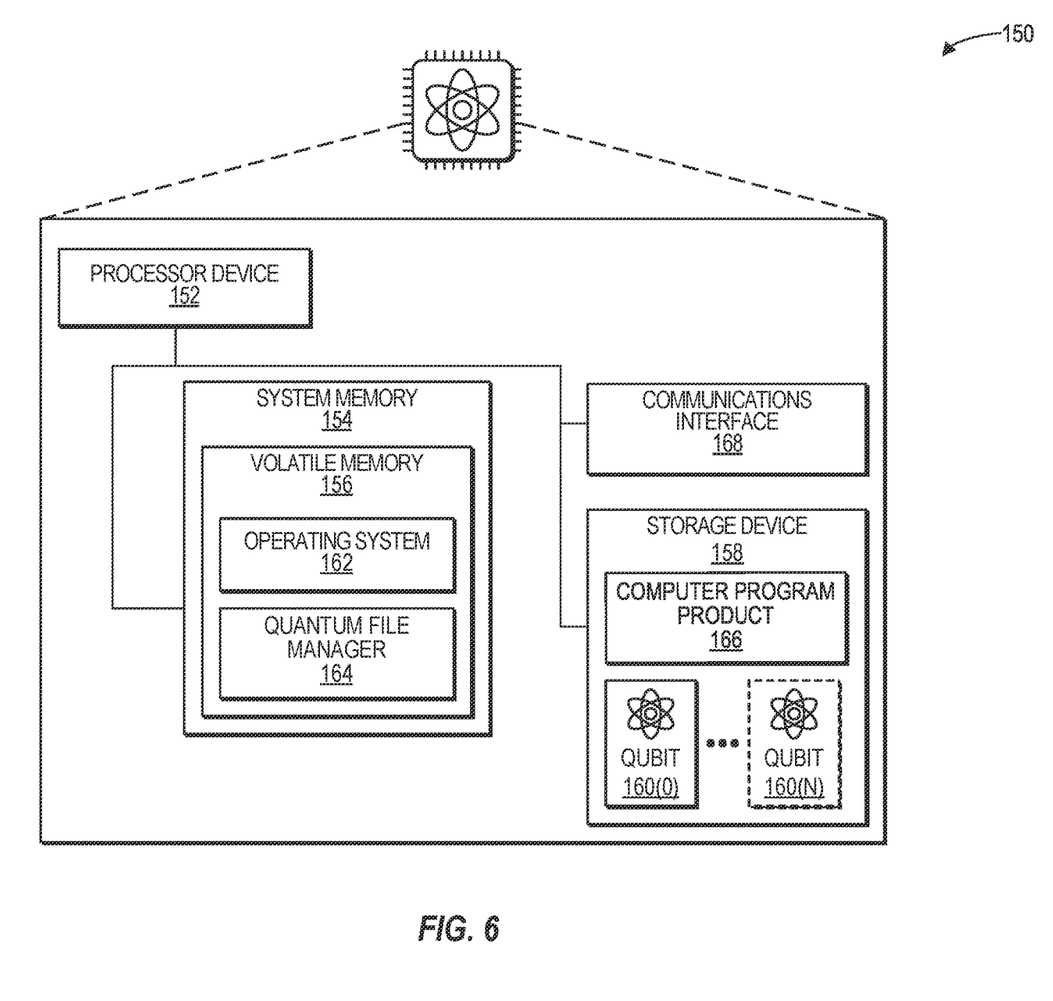
FIG. 6 is a block diagram of a quantum computing device suitable for implementing examples, according to one example.

FIG. 6 is a block diagram of a quantum computing device 150, such as the quantum computing device 12 and the quantum computing device 18 of FIG. 1, suitable for implementing examples according to one example. The quantum computing device 150 may comprise any suitable quantum computing device or devices. The quantum computing device 150 can operate using classical computing principles or quantum computing principles. When using quantum computing principles, the quantum computing device 150 performs computations that utilize quantum-mechanical phenomena, such as superposition and entanglement. The quantum computing device 150 may operate under certain environmental conditions, such as at or near zero degrees (0°) Kelvin. When using classical computing principles, the quantum computing device 150 utilizes binary digits that have a value of either zero (0) or one (1).

The quantum computing device 150 includes a processor device 152 and the system memory 154. The processor device 152 can be any commercially available or proprietary processor suitable for operating in a quantum environment. The system memory 154 may include volatile memory 156 (e.g., random-access memory (RAM)). The quantum computing device 150 may further include or be coupled to a non-transitory computer-readable storage medium such as a storage device 158, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 158 and other drives associated with computer-readable media and computer-usable media may provide non-volatile storage of data, data structures, computer-executable instructions, and the like. The storage device may also provide functionality for storing one or more qubits 160(0)-160(N).

A number of modules can be stored in the storage device 158 and in the volatile memory 156, including an operating system 162 and one or more modules, such as a quantum file manager 164. All or a portion of the examples may be implemented as a computer program product 166 stored on a transitory or non-transitory computer-usable or computer-readable storage medium, such as the storage device 158, which includes complex programming instructions, such as complex computer-readable program code, to cause the processor device 152 to carry out the steps described herein. Thus, the computer-readable program code can comprise software instructions for implementing the functionality of the examples described herein when executed on the processor device 152. An operator may also be able to enter one or more configuration commands through a keyboard (not illustrated), a pointing device such as a mouse (not illustrated), or a touch-sensitive surface such as a display device. The quantum computing device 150 may also include a communications interface 168 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:
   accessing, by a quantum computing device, a first quantum file registry record that corresponds to a first quantum file;
   identifying a first plurality of qubits and a location of each qubit of the first plurality of qubits based on the first quantum file registry record;
   accessing, by the quantum computing device, a second quantum file registry record that corresponds to a second quantum file;
   identifying a second plurality of qubits and a location of each qubit of the second plurality of qubits based on the second quantum file registry record; wherein:
      the first plurality of qubits and the second plurality of qubits are in a state of superposition;
   accessing a first plurality of data values for the first plurality of qubits and a second plurality of data values for the second plurality of qubits, wherein accessing the first plurality of data values and the second plurality of data values comprises, for each qubit in the first plurality of qubits and the second plurality of qubits:
      performing a plurality of read operations of the qubit; and
      determining a data value for the qubit based on the plurality of read operations;
   performing a file difference operation using the first plurality of data values and the second plurality of data values, wherein the file difference operation comprises one or more of identifying data values of the first plurality of data values and the second plurality of data values found exclusively in one or the other of the first quantum file and the second quantum file, or data values found in both the first quantum file and the second quantum file but in different locations of the first quantum file and the second quantum file; and
   generating a result based on the file difference operation.

2. The method of claim 1, wherein performing the plurality of read operations of the qubit comprises performing a predetermined number of read operations of the qubit.

3. The method of claim 1, wherein performing the plurality of read operations of the qubit comprises repeatedly performing read operations of the qubit until expiration of a predetermined time interval.

4. The method of claim 1, wherein performing the plurality of read operations of the qubit comprises determining a confidence indicator for an outcome of each read operation of the plurality of read operations for the qubit.

5. The method of claim 4, wherein performing the plurality of read operations of the qubit further comprises repeatedly performing read operations of the qubit until the confidence indicator exceeds a confidence threshold.

6. The method of claim 1, wherein determining the data value for the qubit is further based on an initial state for the qubit defined by a Quantum Assembly Language (QASM) file.

7. The method of claim 1, further comprising:
   receiving a first file identifier that identifies the first quantum file;
   accessing the first quantum file registry record of the first quantum file using the first file identifier;
   identifying the first plurality of qubits and a location of each qubit of the first plurality of qubits based on the first quantum file registry record;

receiving a second file identifier that identifies the second quantum file;
accessing the second quantum file registry record of the second quantum file using the second file identifier; and
identifying the second plurality of qubits and a location of each qubit of the second plurality of qubits based on the second quantum file registry record.

8. The method of claim 1, further comprising determining that each qubit of the first plurality of qubits and the second plurality of qubits is in an entanglement state of not entangled;
wherein accessing the first plurality of data values for the first plurality of qubits and the second plurality of data values for the second plurality of qubits is responsive to the determining.

9. The method of claim 1, wherein the result comprises an indication of a difference between a first data value of the first plurality of data values and a corresponding second data value of the second plurality of data values.

10. A quantum computing device comprising:
a system memory; and
a processor device coupled to the system memory to:
access a first quantum file registry record that corresponds to a first quantum file;
identify a first plurality of qubits and a location of each qubit of the first plurality of qubits based on the first quantum file registry record;
access a second quantum file registry record that corresponds to a second quantum file;
identify a second plurality of qubits and a location of each qubit of the second plurality of qubits based on the second quantum file registry record; wherein:
the first plurality of qubits and the second plurality of qubits are in a state of superposition;
access a first plurality of data values for the first plurality of qubits and a second plurality of data values for the second plurality of qubits, wherein to access the first plurality of data values and the second plurality of data values is to, for each qubit in the first plurality of qubits and the second plurality of qubits:
perform a plurality of read operations of the qubit; and
determine a data value for the qubit based on the plurality of read operations;
perform a file difference operation using the first plurality of data values and the second plurality of data values, wherein the file difference operation comprises one or more of identifying data values of the first plurality of data values and the second plurality of data values found exclusively in one or the other of the first quantum file and the second quantum file, or data values found in both the first quantum file and the second quantum file but in different locations of the first quantum file and the second quantum file; and
generate a result based on the file difference operation.

11. The quantum computing device of claim 10, wherein to perform the plurality of read operations of the qubit is to perform a predetermined number of read operations of the qubit.

12. The quantum computing device of claim 10, wherein to perform the plurality of read operations of the qubit is to repeatedly perform read operations of the qubit until expiration of a predetermined time interval.

13. The quantum computing device of claim 10, wherein to perform the plurality of read operations of the qubit is to determine a confidence indicator for an outcome of each read operation of the plurality of read operations for the qubit.

14. The quantum computing device of claim 13, wherein to perform the plurality of read operations of the qubit is further to repeatedly perform read operations of the qubit until the confidence indicator exceeds a confidence threshold.

15. The quantum computing device of claim 10, wherein to determine the data value for the qubit is further based on an initial state for the qubit defined by a Quantum Assembly Language (QASM) file.

16. The quantum computing device of claim 10, wherein the processor device is further to:
receive a first file identifier that identifies the first quantum file;
access the first quantum file registry record of the first quantum file using the first file identifier;
identify the first plurality of qubits and a location of each qubit of the first plurality of qubits based on the first quantum file registry record;
receive a second file identifier that identifies the second quantum file;
access the second quantum file registry record of the second quantum file using the second file identifier; and
identify the second plurality of qubits and a location of each qubit of the second plurality of qubits based on the second quantum file registry record.

17. The quantum computing device of claim 10, wherein the processor device is further to determine that each qubit of the first plurality of qubits and the second plurality of qubits is in an entanglement state of not entangled;
wherein to access the first plurality of data values for the first plurality of qubits and the second plurality of data values for the second plurality of qubits is responsive to the determining.

18. The quantum computing device of claim 10, wherein the result comprises an indication of a difference between a first data value of the first plurality of data values and a corresponding second data value of the second plurality of data values.

19. A computer program product comprising a non-transitory computer-readable medium having stored thereon computer-executable instructions which, when executed, cause a processor device to:
access a first quantum file registry record that corresponds to a first quantum file;
identify a first plurality of qubits and a location of each qubit of the first plurality of qubits based on the first quantum file registry record;
access a second quantum file registry record that corresponds to a second quantum file;
identify a second plurality of qubits and a location of each qubit of the second plurality of qubits based on the second quantum file registry record; wherein:
the first plurality of qubits and the second plurality of qubits are in a state of superposition;
access a first plurality of data values for the first plurality of qubits and a second plurality of data values for the second plurality of qubits, wherein to access the first plurality of data values and the second plurality of data values is to, for each qubit in the first plurality of qubits and the second plurality of qubits:
perform a plurality of read operations of the qubit; and
determine a data value for the qubit based on the plurality of read operations;

perform a file difference operation using the first plurality of data values and the second plurality of data values, wherein the file difference operation comprises one or more of identifying data values of the first plurality of data values and the second plurality of data values found exclusively in one or the other of the first quantum file and the second quantum file, or data values found in both the first quantum file and the second quantum file but in different locations of the first quantum file and the second quantum file; and generate a result based on the file difference operation.

20. The computer program product of claim 19, wherein the computer-executable instructions further cause the processor device to:
receive a first file identifier that identifies the first quantum file;
access the first quantum file registry record of the first quantum file using the first file identifier;
identify, based on the first quantum file registry record, the first plurality of qubits and a location of each qubit of the first plurality of qubits;
receive a second file identifier that identifies the second quantum file;
access the second quantum file registry record of the second quantum file using the second file identifier; and
identify, based on the second quantum file registry record, the second plurality of qubits and a location of each qubit of the second plurality of qubits.

\* \* \* \* \*